April 21, 1931.  G. H. ISLEY  1,801,670
RECUPERATIVE FURNACE CONTROL
Filed Jan. 3, 1928
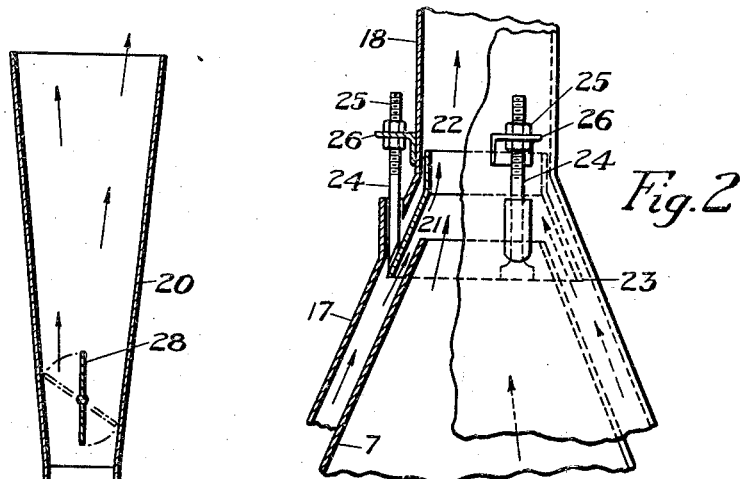
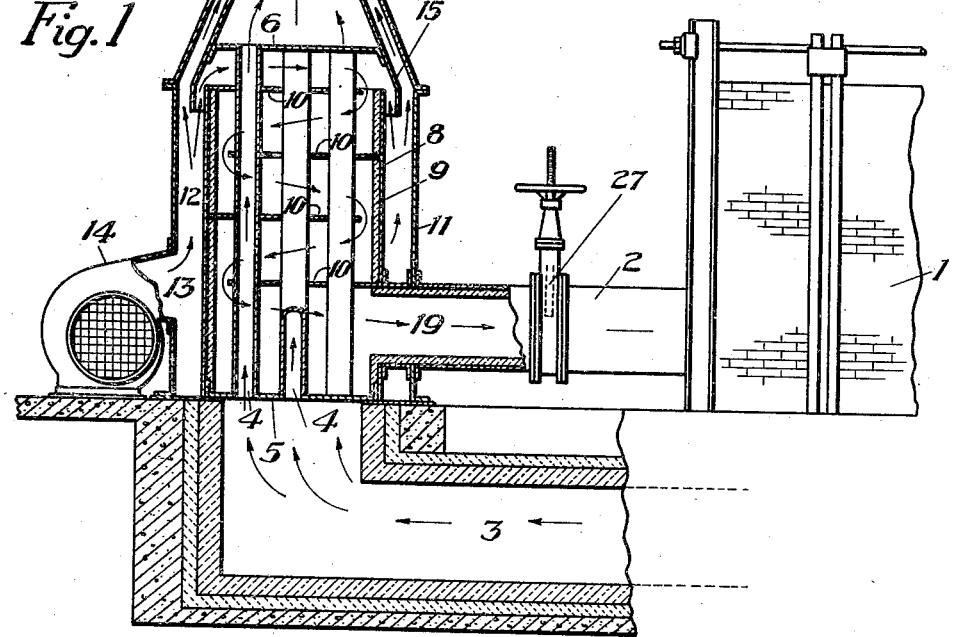
Inventor
George H. Isley.

Patented Apr. 21, 1931

1,801,670

UNITED STATES PATENT OFFICE

GEORGE H. ISLEY, OF WORCESTER, MASSACHUSETTS, ASSIGNOR TO MORGAN CONSTRUCTION COMPANY, OF WORCESTER, MASSACHUSETTS, A CORPORATION OF MASSACHUSETTS

RECUPERATIVE-FURNACE CONTROL

Application filed January 3, 1928. Serial No. 244,165.

The present invention relates to a system of recuperative furnace control, as embodied in the structure and mode of operation of a recuperator employed for preheating the air that is used to support combustion of fuel in a metal-heating or other similar furnace. According to the invention, a suitable blowing device or fan is used to blow air into the novel recuperator structure,—a part of this air being preheated in the recuperator before passing to the furnace, and the remainder being so directed as to serve as a drafting means for the waste furnace gases passing through said recuperator, thereby eliminating any need for the usual expensive stack that is an adjunct of all recuperative furnaces now in ordinary use. In addition, my new system, as hereinafter described, lends itself most advantageously to an exact control of the conditions prevailing in the furnace; other and further objects and advantages of the invention are fully set forth in the description thereof, in connection with which reference is had to the accompanying drawings, wherein Fig. 1 is a vertical sectional view illustrating one form of the novel recuperator structure as applied to the air inlet and the waste gas outlet of a furnace, and Fig. 2 is a fragmentary view, partly in section and on an enlarged scale, showing a detail of the recuperator structure.

Like reference characters refer to like parts in the different figures.

Referring first to Fig. 1, a portion of a metal-heating or similar furnace is indicated conventionally at 1, said furnace, as shown, having an exterior connection 2, leading to its interior, and providing a passage for the preheated air which is used to support the combustion of the fuel within said furnace. From the opposite end, not shown, of the furnace, the hot waste gases are taken off through an exhaust passage 3, the latter as here shown being in the form of an underground return passage that has its terminal not far removed from the air supply connection 2, so that the hot waste gases can be conveniently utilized for preheating the air supply of the furnace.

The air-preheating device, or recuperator, employed for this purpose, according to my invention, may consist in part, as shown in Fig. 1, of a plurality of open-ended tubes 4, 4 that are assembled by connection at each end with lower and upper apertured headers or plates 5 and 6, respectively. The lower header 5 of this multi-tube assembly overlies the ground-level terminal of exhaust passage 3, so that the hot waste furnace gases conveyed by said exhaust passage will travel upwardly through said tubes 4, 4 and will discharge from the upper ends of said tubes into a hollow substantially conical member 7, carried by the upper header 6. The assembly of tubes 4, 4 is surrounded, for the major portion of its height, by a shell 8 which is carried by the lower header 5, and which preferably has an interior wall 9 of insulating material. A series of horizontal baffle plates 10, 10, carried interiorly of the shell 8, are apertured for the passage therethrough of the several tubes 4, 4, and these baffle plates 10, 10 are in the usual staggered relation to each other, so as to provide a tortuous passage for the furnace air supply in the process of heating it by contact with the hot tubes 4, 4.

An outer casing 11 incloses the shell 8, with a space 12 left between the walls of said casing and said shell. Into this space 12, through a suitable opening 13 in casing 11, air is blown from a blowing device or fan 14, the latter being preferably operated by a variable speed motor, not shown. The hollow member 7 has a skirt 15 which extends into the space 12 and which lies intermediate the wall of shell 8 and the wall of casing 11, being spaced from each of said walls. Thus a part of the air blown into the space 12 finds its way to the interior of shell 8 by passage beneath the skirt 15, while the rest of said air goes outside of said skirt into the relatively narrow space 16 between the member 7 and an upper extension 17 of casing 11, which extension 17 conforms substantially to the shape of member 7 by contracting gradually to form a neck 18 above said member.

The air that passes under the skirt 15 and into the shell 8 descends in zigzag fashion by reason of the baffle plates 10, 10 and from its prolonged contact with the hot tubes 4, 4 is very efficiently heated by the time it reaches the outlet 19 from the lower end of said shell, which outlet 19, extending through the casing 11, conveys the heated air to the air supply connection 2 of the furnace 1. The balance of the air forced upwardly through the space 16 has its velocity materially increased by the upward contraction of the walls 7 and 17 that define said space, so that said air, on reaching the neck 18 is traveling at a relatively high velocity.

The effect of this high velocity of air in the contracted neck portion 18 is to exert a very decided entraining action on the waste furnace gases in the tubes 4, 4, this entrainment being intensified by the contraction of the upper open end of member 7 through which said waste gases discharge. Consequently, the action of the air that is blown into the space 12 exerts a steady and constant draft on the furnace, making it unnecessary to provide the usual high and expensive stack for this purpose; instead, the mixture of air and cooled waste gases entering the neck 18 can be discharged directly to the atmosphere through a relatively short expansion tube 20 that extends upwardly from the neck 18.

As shown in Fig. 2, provision is made for varying and controlling the drafting effect of the air on the waste gases discharged from member 7. This is done through the medium of an adjustable member 21 having an upper portion 22 that fits slidingly within the lower end of neck 18, and a lower portion 23 that flares outwardly into the space 16 between member 7 and wall 17. Said member 21 is carried by a plurality of rods 24, 24 which pass through openings in wall 17 and are adjustably secured by nuts 25, 25 to brackets 26, 26 on the outside of neck 18. A downward adjustment of member 21, through the lowering of rods 24, 24, restricts the outlet of air from space 16, and upward adjustment of said member 21, by raising the rods 24, 24 increases the area of said air outlet. Thus the air outlet from the space 16 constitutes an adjustable nozzle, by which the pressure, volume and velocity of the air, and its entraining action on the waste furnace gases, can be readily controlled. Also, volumetric control of the preheated air that passes from the recuperator structure to the furnace may be afforded by a pressure regulated valve 27, Fig. 1, in the air passage formed by the recuperator outlet 19 and the furnace connection 2. In addition, further control of the volume of air is afforded by the variable speed motor, not shown, that drives the blowing device 14.

The mode of operation of my improved system will be apparent from the foregoing description thereof. Not only does said system secure advantages pertaining to control of draft and furnace conditions that are not attainable in previous recuperator-equipped furnaces, but said air-blown recuperator, of and by itself, is far superior to other types of recuperators, from the standpoints of long life and freedom from trouble in operation.

In the ordinary recuperators, elaborate provision, in the form of expansion joints and the like, must be made to take care of the expansion, when heated, of the long tubes or other conduits that carry the waste furnace gases. No such problem is present when my improved recuperator structure is used, because the tubes 4, 4 are free to expand and contract without interference from any other part of the structure,—the only effect being to raise or lower the member 7, since said tubes pass freely, without binding, through the apertures of the baffle plates 10, 10. Moreover, said tubes 4, 4 are readily accessible for inspection or repair by simply lifting off the superposed parts 17 and 7; in other recuperators it is frequently necessary to tear down the walls extensively, in order to get at the flues.

If desired, the expansion tube 20 may be equipped with a suitable damper 28 which provides a further means for regulating the draft and which, when moved into closed position, as indicated by the broken lines in Fig. 1, will serve to hold the heat in the furnace during periods of shutdown.

I claim:

1. In a recuperator, a plurality of tubes for the outgoing hot waste furnace gases, a shell in surrounding relation to said tubes and providing a tortuous passage for the flow of air in heat-absorbing contact with the surfaces of said tubes, and an inclosing casing spaced from said shell into which the air to be heated is blown, said casing surrounding the upper ends of said tubes, beyond said shell, and providing a nozzle for the discharge of excess air to the atmosphere, in entraining relation to the waste furnace gases discharged from the upper ends of said tubes.

2. The combination with a recuperator-equipped furnace, of means for supplying air under pressure to said recuperator in excess of the quantity needed for combustion of the fuel in said furnace, means within said recuperator for directing said needed quantity of air for combustion purposes into counter-current heat exchanging relation with the waste furnace gases, and means for entraining said waste furnace gases by the discharge from said recuperator of the unheated balance of the air so supplied, said last named means comprising a nozzle of variable outlet area.

GEORGE H. ISLEY.